(No Model.)

E. P. WAGGONER.
PIPE COLLAR.

No. 386,671. Patented July 24, 1888.

WITNESSES:
A. E. Parsons
H. C. McArthur

INVENTOR.
Edward P. Waggoner.
BY
Huy & Sibly
ATTORNEYS.

UNITED STATES PATENT OFFICE.

EDWARD P. WAGGONER, OF SYRACUSE, NEW YORK, ASSIGNOR OF ONE-HALF TO THE PIERCE, BUTLER & PIERCE MANUFACTURING COMPANY, OF SAME PLACE.

PIPE-COLLAR.

SPECIFICATION forming part of Letters Patent No. 386,671, dated July 24, 1888.

Application filed December 17, 1887. Serial No. 258,149. (No model.)

*To all whom it may concern:*

Be it known that I, EDWARD P. WAGGONER, of Syracuse, in the county of Onondaga, in the State of New York, have invented new and useful Improvements in Pipe-Collars, of which the following, taken in connection with the accompanying drawings, is a full, clear, and exact description.

This invention relates to an improvement in pipe-collars; and it consists in certain peculiarities of the construction and arrangement of the same, substantially as will be hereinafter more fully set forth and claimed.

In order to enable others skilled in the art to which my invention pertains to make and use the same, I will now proceed to describe its construction and use, referring to the accompanying drawings, in which—

Figure 1:
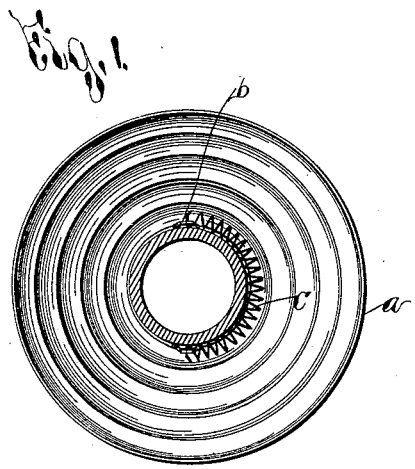
Figure 2:
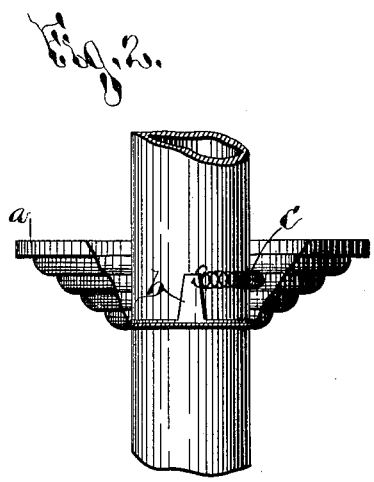
Figure 3:
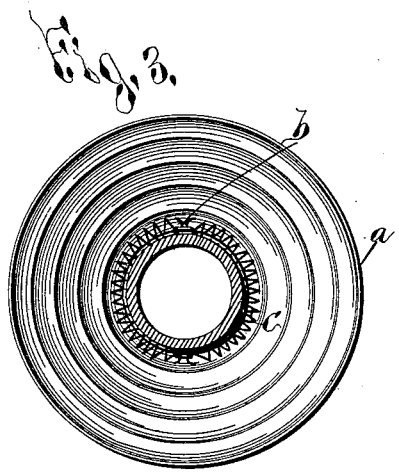
Figure 4:
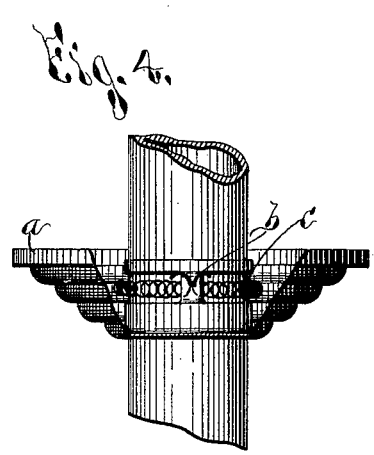

Figure 1 is a plan view, and Fig. 2 a side view, partly broken away, of my preferred form of collar, while Figs. 3 and 4 are similar views of a slight modification of the same.

*a* represents a pipe-collar, made of metal, and pressed, cast, spun, or otherwise formed of the desired shape and size for the purpose in view. The collar is of course formed with a central opening to admit the passage of the pipe, and on its inner side on each side of the opening is a projecting stud, *b*. These studs are connected around the pipe, on one or both sides, by an elastic band, *c*, which closely hugs the pipe and so retains the collar firmly in place. This band is made of any material suitable to the purpose; but I prefer to use the one shown in the drawings, formed of a spiral of spring-wire.

It will be at once understood that I shall construct these collars of various metals and in various ways, according to the use they are intended for, and shall also make different sizes to fit stove-pipes, water or gas pipes, &c., the collar being placed over the pipe and pushed up against a wall or partition, requiring no other fastening, as it is held firmly against any change of position by the elasticity of the spring-band *c*.

In Figs. 3 and 4 I have shown a modification, in which the collar is provided with a sleeve fitting the pipe and slotted out on its sides to give the spring-bands *c* a chance to grasp the pipe body. This form will prove of value for some purposes; but I prefer that first described as cheaper and much more simple.

Having thus fully described my invention, what I claim as new, and desire to secure by Letters Patent, is—

A pipe-collar having studs inside its central opening and an elastic band connecting the studs for closely hugging the pipe, substantially as and for the purpose set forth.

In testimony whereof I have hereunto signed my name in the presence of two attesting witnesses, at Syracuse, in the county of Onondaga, in the State of New York, this 5th day of December, 1887.

EDWARD P. WAGGONER.

Witnesses:
FREDERICK H. GIBBS,
E. C. CANNON.